United States Patent [19]

Nakatsuji et al.

[11] Patent Number: 5,378,745
[45] Date of Patent: Jan. 3, 1995

[54] WEATHER-RESISTANT THERMOPLASTIC RESIN COMPOSITION

[76] Inventors: Yoshihiro Nakatsuji, 2-10-3-310, Sonehigashimachi, Toyonaka-shi, Osaka 561; Masayuki Yoshihara, 6-15-24-604, Toneyama, Toyonaka-shi, Osaka 560; Hiroaki Maruyama, 9-6-5, Honmachi, Toyonaka-shi, Osaka 560; Toshio Igarashi, 59, Shimogamo-Miyazakicho, Sakyo-ku, Kyoto-shi, Kyoto 606, all of Japan

[21] Appl. No.: 183,792

[22] Filed: Jan. 21, 1994

Related U.S. Application Data

[63] Continuation of Ser. No. 709,367, Jun. 3, 1991, abandoned, which is a continuation of Ser. No. 410,550, Sep. 21, 1989, abandoned.

[30] Foreign Application Priority Data

Sep. 29, 1988 [JP] Japan ................. 63-248672

[51] Int. Cl.$^6$ ........................... C08K 5/34
[52] U.S. Cl. .................. 524/99; 524/100; 524/521; 524/522
[58] Field of Search ............ 524/99, 100, 521, 522

[56] References Cited

U.S. PATENT DOCUMENTS

| | | | |
|---|---|---|---|
| 3,547,879 | 12/1970 | Murayama et al. | 524/102 |
| 3,692,778 | 9/1972 | Murayama et al. | 524/100 |
| 4,418,168 | 11/1983 | Johnson | 524/568 |
| 4,490,491 | 12/1984 | Devona et al. | 524/555 |
| 4,663,384 | 5/1987 | Penzel et al. | 524/555 |
| 4,822,833 | 4/1989 | Zappia et al. | 524/99 |

FOREIGN PATENT DOCUMENTS 0365481 4/1990 European Pat. Off. .
489107 3/1973 Japan .
5342347 11/1978 Japan .
1485278 9/1977 United Kingdom .

OTHER PUBLICATIONS

Search Report re EP 89 30 9848.
Chemical Abstracts, vol. 93, No. 8, (Aug. 1990), p. 52, abstract No. 73019t.
Patent Abstracts of Japan, p. 99 C 15.
"Elucidation of Stabilization of Polyvinylchloride and Practical Influence of Stabilizer", pp. 176–182 (1984).
Encyclopedia of Chemical Technology, Third Edition, vol. 23, pp. 620–624.
JIS (Japanese Industrial Standard) JIS K 7111–1984 Pub. Japanese Standards Assoc.
JIS (Japanese Industrial Standard) A 1415–1977 Pub. Japanese Standards Assoc.
R. Gachter and H. Muller "Taschenbuch der Kunststoff–Additive", 3. Ausgabe, (1990), p. 255 and Table 51 (2).
R. Gachter and H. Muller "Taschenbuch der Kunststoff–Additive", 2. Ausgabe, (1983), pp. 175–178.
Chemical Abtstracts, vol. No. 93, (1980), p. 52.

*Primary Examiner*—Kriellion S. Morgan
*Attorney, Agent, or Firm*—Cushman, Darby & Cushman

[57] ABSTRACT

A weather-resistant thermoplastic resin composition excellent in processing stability is provided which comprises 100 parts by weight of a mixture of 40–100 parts by weight of a vinyl chloride polymer and 0–60 parts by weight of a polymer containing no chlorine and having a glass transition temperature of 100°–200° C.; 4–25 parts by weight of an impact strength modifier containing no double bond; and 0.1–1.0 part by weight of a hindered amine light stabilizer. Molded articles made from this composition are especially excellent in weather resistance and are useful as pipes outdoors or building materials.

9 Claims, No Drawings

WEATHER-RESISTANT THERMOPLASTIC RESIN COMPOSITION

This application is a continuation of application Ser. No. 07/709,367, filed Jun. 3, 1991, now abandoned, which in turn is a continuation of application Ser. No. 07/410,550, filed Sep. 21, 1989, and now abandoned.

The present invention relates to a thermoplastic resin composition improved in weather resistance.

Vinyl chloride resin articles have problems in impact resistance and heat resistance and many attempts have been made to improve these properties. One of approaches to improve impact resistance is to blend chlorinated polyethylene, ethylene-vinyl acetate copolymer to which vinyl chloride is grafted or impact strength modifiers such as acryl rubber with the resin articles, taken into consideration of weather resistance.

Another approach for improving impact resistance as well as heat resistance is to blend the above impact strength modifier and a heat resistance modifier such as α-methylstyrene-acrylonitrile copolymer.

However, although these vinyl chloride resin articles improved in impact resistance or both impact resistance and heat resistance are somewhat improved in weather resistance, the improvement is not satisfactory yet. When the articles are in the shape of pipes or building materials and are used outdoors under relatively severe conditions for a long time, they undergo photo-deterioration with lapse of time, resulting in reduction of impact strength.

Hitherto, in order to prevent vinyl chloride resin compositions from photo-deterioration and stabilize them, proposals have been made to add so-called light screens which intercept light or ultraviolet absorbers which absorb undesirable light and convert it to harmless heat energy. However, in order to sufficiently improve weather resistance by adding fillers such as carbon black, $TiO_2$ and ZnO as light screens, they must be used in a large amount. As a result, amount of pigments used for color matching is naturally increased and deterioration of properties occurs due to excess lubrication caused by dispersant contained in the pigments and besides cost is also high. Further, addition of ultraviolet absorbers such as of salicylic esters, benzophenones and benzotriazoles is also not satisfactory yet to improve weather resistance.

On the other hand, light stabilizers made from hindered amine which trap radicals produced by heat or light energy do not perform sufficiently as light stabilizers for vinyl chloride resins.

An object of the present invention is to provide a vinyl chloride resin composition improved in impact resistance or both the impact resistance and heat resistance and sufficiently enhanced in weather resistance without damaging the excellent processing stability and mechanical strengths.

As a result of the inventors' intensive research, it has been found that hindered amine light stabilizers which do not exhibit sufficient effect as light stabilizers for vinyl chloride resins markedly improve weather resistance of a polymer mixture which comprises a vinyl chloride polymer or a mixture of a vinyl chloride polymer and a polymer containing no chlorine and having a glass transition temperature of 100°–200° C. and at least one impact strength modifier containing no double bond.

That is, the present invention provides a thermoplastic resin composition superior in weather resistance which comprises 100 parts by weight of a mixture comprising 100–40 parts by weight of a vinyl chloride polymer and 0–60 parts by weight of a polymer containing no chlorine and having a glass transition temperature of 100°–200° C. and 4–25 parts by weight of at least one impact strength modifier containing no double bond and 0.1–1.0 part by weight of a hindered amine light stabilizer.

The feature of the thermoplastic resin composition of the present invention resides in that a specific amount of at least one impact strength modifier containing no double bond and a specific amount of a hindered amine stabilizer are contained in 100 parts by weight of a vinyl chloride polymer with or without a specific amount of a polymer containing no chlorine and having a glass transition temperature of 100°–200° C.

When a vinyl chloride polymer is used alone, dynamic heat stability is superior and processing stability is high. When the vinyl chloride polymer is mixed with chlorinated vinyl chloride polymer, heat resistance and mechanical strength are improved. Furthermore, when at least one impact strength modifier containing no double bond is added to vinyl chloride polymer, impact resistance is markedly improved. When at least one impact strength modifier containing no double bond is added to a mixture of a vinyl chloride polymer and a polymer containing no chlorine and having a glass transition temperature of 100°–200° C., not only impact resistance is improved, but also heat resistance and mechanical strength becomes higher.

Component (1)

The component (1) comprises vinyl chloride polymers. They include vinyl chloride homopolymer and copolymers comprising at least 90% by weight of a vinyl chloride monomer and up to 10% by weight of a monoolefin copolymerizable with the vinyl chloride monomer, for example, vinyl acetate or vinylidene chloride. The polymers are produced by suspension polymerization, bulk polymerization, emulsion polymerization, etc.

The chlorinated vinyl chloride polymers used in the present invention are produced by known process, for example, by suspending in water a vinyl chloride polymer with or without a chlorinated hydrocarbon solvent, and then applying chlorine-addition thereto. This chlorinated vinyl chloride polymer is added preferably in an amount of 5–50%, more preferably 10–40% by weight of vinyl chloride polymer. If the amount is less than 5% by weight, improvement of heat resistance is not sufficient and if more than 50% by weight, processing stability is insufficient.

The polymers containing no chlorine and having a glass transition temperature of 100°–200° C. which are used as one of components in (1) are those which enhance heat resistance of vinyl chloride resins. They are, for example, poly α-methylstyrene, copolymers mainly composed of α-methylstyrene such as α-methylstyrene/acrylonitrile copolymer, imide polymers such as poly N-phenylmaleimide or polyglutarimide, and styrene/maleic anhydride copolymer. Preferred are α-methylstyrene/acrylonitrile copolymer, polyglutarimide and styrene/maleic anhydride copolymer, taking into consideration of compatibility with vinyl chloride polymer and enhancement of heat resistance. The glass transition temperature is a point at which gradient of volume-temperature curve according to dilatometer abruptly changes and if this is lower than 100° C., enhancement of heat resistance is insufficient and if this is higher than 200° C., processing temperature is naturally high and processing stability of vinyl chloride resin is inferior.

With reference to mixing ratio of the vinyl chloride polymer and the polymer containing no chlorine and having a glass transition temperature of 100°–200° C., amount of the latter polymer, i.e., that containing no chlorine, must be 0–60 parts by weight every 100 parts by weight of (1). In order to improve heat-resistance, in particular, the latter polymer should be 5–60 parts, preferably 20–60 parts. If more than 60 parts by weight is used, impact resistance decreases.

Component (2)

As component (2), one or more impact strength modifiers containing no double bond are used. Examples of the component (2) are chlorinated polyethylene, graft copolymers comprising ethylene/vinyl acetate copolymer or ethylene/methacrylate copolymer on which vinyl chloride is grafted and acrylic rubber. It is necessary to add these impact strength modifiers in an amount of 4–25 parts, preferably 5–20 parts by weight every 100 parts by weight of component (1). If it is less than 4 parts by weight, improvement of impact resistance is insufficient and if more than 25 parts by weight, mechanical strength is insufficient.

Component (3)

Hindered amine stabilizers are used for component (3). They have the structure where all hydrogen atoms on carbons of 2-position and 6-position of piperidine are substituted with methyl groups and are added in an amount of 0.1–1.0 part, preferably 0.2–0.8 part, by weight on the basis of 100 parts by weight of component (1) above. If the amount is less than 0.1 part by weight, improvement of weather resistance is insufficient and even if it is more than 1.0 parts by weight, the effect is not increased.

Processing

For processing of the composition of the present invention, there may be optionally added known stabilizers, lubricants, ultraviolet ray absorbers, antioxidants, pigments, etc. which are commonly used for processing of vinyl chloride resins and furthermore, if necessary, fillers may also be used.

Components (1)–(3) above are mixed by roll mills, ribbon blenders, Henschel mixers, Banbury mixers, etc. and are processed into desired molded articles by known molding machines such as extruders, injection molding machines or calendering machines. The resulting molded articles are high in mechanical strength and excellent in impact resistance and heat resistance and besides are improved in weather resistance. Therefore, they are useful as rigid articles such as pipes and building materials.

The present invention will be explained by the following nonlimiting examples. Properties were measured by the following methods. Part and percent in the examples are by weight.

Evaluation of impact resistance: Charpy impact strength measured in accordance with JIS K7111.

Evaluation of weather resistance: Charpy impact strength measured in accordance with JIS K7111 on a sample subjected to exposure for 300 hours under the conditions of black panel temperature of 63° C. and spraying of 18 min/120 minutes using a sunshine weatherometer type accelerated weathering apparatus specified in JIS A1415.

Furthermore, retension of Charpy impact strength is obtained by the following formula.

$$\frac{\text{Charpy impact strength after exposure for 300 hr}}{\text{Charpy impact strength before exposure}} \times 100$$

Evaluation of heat resistance: Vicat softening point measured under a load of 5 Kgf in accordance with JIS K7206.

Evaluation of mechanical strength: Resin composition was filled in mixer head of roller mixer W50H type and kneaded at 200° C. and 50 rpm and time required for the composition beginning to decompose was measured by plasticorder-PLV151 of Brabender Co.

EXAMPLE 1

To a resin composition comprising a polymer mixture of polyvinyl chloride having an average polymerization degree of 1100 (100 parts; "Sumilit" ® Sx11F of Sumitomo Chemical Co., Ltd.), graft polymer A (6 parts) prepared by the following process and acrylic rubber (6 parts; Kane Ace FM of Kanegafuchi Chemical Industry Co., Ltd.), were added a lead stabilizer (3 parts), a metallic soap lubricant (1 part), a processability modifier (1.5 parts), a pigment (0.8 part) and a hindered amine stabilizer (0.3 part; Chimassorb 944LD of Ciba-Geigy Corp.). The blend was kneaded and extruded to shape pipes by a different direction twin-screw extruder Mitsubishi Kraus KMD-60K at 25 rpm and under the following temperature conditions: cylinders: ①165° C., ②160° C., ③ 170° C. and ④ 175° C., adapter: ④ 170° C., dies: ① 160° C., ② 153° C., ③ 167° C. and ④ 180° C. Mechanical strength, heat resistance, weather resistance and impact resistance of the resulting pipes were measured. Separately, dynamic heat stability of the above composition was also measure by the above-mentioned method. The results are shown in Table 1.

Preparation of Graft Copolymer A

Deionized water (100 parts), ethylene/methyl methacrylate copolymer (50 parts; "Acryft" ® WM-305 of Sumitomo Chemical Co., Ltd.), hydroxypropylmethyl cellulose (0.2 part; "Metholose" ® 65SH-50 of Shinetsu Chemical Co., Ltd.), α,α'-azobisisobutyronitrile (0.08 part), and diallyl phthalate (0.5 part) were charged in a stainless steel autoclave, which was then evacuated to 30 mmHg. Then, vinyl chloride monomer (50 parts) was charged therein and polymerization was started by heating to 60° C. with stirring.

After 6 hours, polymerization was discontinued and unreacted vinyl chloride monomer was purged and the content was taken out and dehydrated and dried to obtain graft polymer A, which contained 59% of ethylene/methyl methacrylate copolymer and had 43% of gel content insoluble in tetrahydrofuran.

EXAMPLE 2

Example 1 was repeated except that Kane Ace FM (6 parts) was used in place of the graft copolymer A (6 parts). The results are shown in Table 1.

EXAMPLE 3

Example 1 was repeated except that 20 parts of "Sumilit" ® Sx11F (100 parts) was replaced by chlorinated vinyl chloride polymer (heat resistance Kanevinyl of Kanegafuchi Chemical Industry Co., Ltd.). The results are shown in Table 1.

EXAMPLE 4

Example 1 was repeated except that hindered amine stabilizer Sanol LS-770 (Sankyo Co., Ltd.) was used in place of the Chimassorb 944LD. The results are shown in Table 1.

EXAMPLES 5-8

Example 1 was repeated except that amounts of Sumilit Sx11F, the graft copolymer A, Kane Ace FM, and Chimassorb 944LD were changed. The results are shown in Table 1.

EXAMPLE 9

Example 1 was repeated except that the graft polymer A was changed to graft copolymer prepared by grafting vinyl chloride on ethylene/vinyl acetate copolymer (Sumigraft GF of Sumitomo Chemical Co., Ltd.). The results are shown in Table 1.

EXAMPLE 10

Example 1 was repeated except that the graft polymer A was changed to chlorinated polyethylene (Elaslen 301A of Showa Denko KK.). The results are shown in Table 1.

All of resin compositions in Examples 1–10 are superior in dynamic heat stability. Molded articles made from these resin compositions are superior in tensile strength and impact resistance as well as in Charpy impact strength retention percentage after exposure for 300 hrs in weather resistance test.

COMPARATIVE EXAMPLE 1

Example 1 was repeated except that a benzotriazole ultraviolet ray absorber (Sumisorb 300 of Sumitomo Chemical Co,, Ltd.) was used in place of the Chimassorb 944LD. The results are shown in Table 1.

COMPARATIVE EXAMPLE 2

Example 1 was repeated except that amount of the pigment (0.8 part) was changed to 3.0 parts and TiO$_2$ (2.0 parts) was used in place of Chimassorb 944LD. The results are shown in Table 1.

COMPARATIVE EXAMPLES 3-5

Example 1 was repeated except that amounts of the Sumilit Sx11F, graft polymer A, Kane Ace FM and Chimassorb 944LD were changed. The results are shown in Table 1.

COMPARATIVE EXAMPLE 6

Example 1 was repeated except that 80 parts of the Sumilit Sx11F (100 parts) was replaced by chlorinated vinyl chloride polymer. The results are shown in Table 1.

Sample of Comparative Example 1 is insufficient in weather resistance and that of Comparative Example 2 is excess in lubrication and impact resistance is insufficient because a large amount of pigment is added for color matching. Sample of Comparative Example 3 is insufficient in tensile strength and Vicat softening point and that of Comparative Example 4 was insufficient in Charpy impact strength. Sample of Comparative Example 5 was insufficient in weather resistance and that of Comparative Example 6 was inferior in dynamic heat resistance and insufficient in processing stability.

TABLE 1

| | Resin (part) | | | | | | Additive (part) | | |
| --- | --- | --- | --- | --- | --- | --- | --- | --- | --- |
| | Sumilit Sx11F | Heat resistant Kanevinyl | Graft polymer A | Kane Ace FM | Elaslen 301A | Sumigraft GF | Pigment | Light stabilizer Kind | Amount |
| Example | | | | | | | | | |
| 1 | 100 | | 6 | 6 | | | 0.8 | Chimassorb 944LD | 0.3 |
| 2 | 100 | | | 12 | | | 0.8 | Chimassorb 944LD | 0.3 |
| 3 | 80 | 20 | 6 | 6 | | | 0.8 | Chimassorb 944LD | 0.3 |
| 4 | 100 | | 6 | 6 | | | 0.8 | Sanol LS-770 | 0.3 |
| 5 | 100 | | 4 | 4 | | | 0.8 | Chimassorb 944LD | 0.3 |
| 6 | 100 | | 8 | 8 | | | 0.8 | Chimassorb 944LD | 0.3 |
| 7 | 100 | | 6 | 6 | | | 0.8 | Chimassorb 944LD | 0.2 |
| 8 | 100 | | 6 | 6 | | | 0.8 | Chimassorb 944LD | 0.5 |
| 9 | 100 | | | 6 | | 6 | 0.8 | Chimassorb 944LD | 0.3 |
| 10 | 100 | | | 6 | 6 | | 0.8 | Chimassorb 944LD | 0.3 |
| Comparative Example | | | | | | | | | |
| 1 | 100 | | 6 | 6 | | | 0.8 | Sumisorb 300 | 0.3 |
| 2 | 100 | | 6 | 6 | | | 3.0 | TiO$_2$ | 2.0 |
| 3 | 100 | | 35 | 35 | | | 0.8 | Chimassorb 944LD | 0.3 |
| 4 | 100 | | 1 | 1 | | | 0.8 | Chimassorb 944LD | 0.3 |
| 5 | 100 | | 6 | 6 | | | 0.8 | Chimassorb 944LD | 0.03 |
| 6 | 20 | 80 | 6 | 6 | | | 0.8 | Chimassorb 944LD | 0.3 |

TABLE 1-continued

| | | | 944LD | | | |
|---|---|---|---|---|---|---|
| | | | | Charpy impact strength $(Kg\ fcm/cm^2)$ | | Dynamic heat |
| | Tensile strength $(Kgf/mm^3)$ 20° C. | Vicat softening point (°C.) | Before exposure | After exposure for 300 hrs | Retention (%) | stability (min) |
| Example | | | | | | |
| 1 | 4.7 | 82 | 68 | 65 | 96 | 35 |
| 2 | 4.7 | 82 | 77 | 74 | 96 | 34 |
| 3 | 4.9 | 85 | 44 | 41 | 93 | 30 |
| 4 | 4.7 | 82 | 65 | 64 | 98 | 35 |
| 5 | 4.9 | 83 | 37 | 35 | 95 | 33 |
| 6 | 4.5 | 81 | 118 | 114 | 97 | 36 |
| 7 | 4.7 | 82 | 66 | 60 | 91 | 34 |
| 8 | 4.7 | 82 | 68 | 67 | 99 | 36 |
| 9 | 4.7 | 82 | 63 | 61 | 97 | 34 |
| 10 | 4.6 | 81 | 64 | 60 | 94 | 35 |
| Comparative Example | | | | | | |
| 1 | 4.7 | 82 | 68 | 27 | 40 | 35 |
| 2 | 4.5 | 81 | 29 | 23 | 79 | 39 |
| 3 | 2.3 | 66 | 170 | 166 | 98 | 47 |
| 4 | 5.1 | 85 | 12 | 9 | 75 | 31 |
| 5 | 4.5 | 82 | 67 | 18 | 27 | 36 |
| 6 | 5.5 | 98 | 24 | 22 | 92 | 22 |

EXAMPLE 11

Example 1 was repeated except that a polymer mixture comprising Sumilit Sx11F (55 parts), α-methylstyrene/acrylonitrile copolymer (45 parts, monomer ratio=70:30), graft polymer A (5 parts) and Kane Ace FM (10 parts) was used as resin composition. The results are shown in Table 2.

EXAMPLE 12

Example 11 was repeated except that the graft polymer A (5 parts) was changed to Kane Ace FM, namely, Kane Ace (15 parts) was used. The results are shown in Table 2.

EXAMPLE 13

Example 11 was repeated except that 15 parts of the Sumilit Sx11F (55 parts) was replaced by heat resistant Kanevinyl. The results are shown in Table 2.

EXAMPLES 14-18

Example 11 was repeated except that amounts of the polymer and Chimassorb 944LD to be added were changed. The results are shown in Table 2.

EXAMPLE 19

Example 11 was repeated except that the graft polymer A was changed to Sumigraft GF. The results are shown in Table 2.

EXAMPLE 20

Example 11 was repeated except that the graft polymer A was changed to Elaslen 301A. The results are shown in Table 2.

The resin compositions of Examples 11-20 all show good dynamic heat stability and molded articles obtained from these resin compositions are not only high in Charpy impact strength retention after subjected to weathering test for 300 hours, but also superior in mechanical strength, impact resistance and heat resistance.

COMPARATIVE EXAMPLE 7

Example 11 was repeated except that Sumisorb 300 was used in place of the Chimassorb 944LD. The results are shown in Table 2.

COMPARATIVE EXAMPLE 8

Example 11 was repeated except that amount of the pigment (0.8 part) was increased to 3.0 parts and $TiO_2$ (2.0 parts) was used in place of the Chimassorb 944LD. The results are shown in Table 2.

COMPARATIVE EXAMPLES 9-13

Example 11 was repeated except that amounts of the polymer and light stabilizer Chimassorb 944LD to be added were changed. The results are shown in Table 2.

COMPARATIVE EXAMPLE 14

Example 11 was repeated except that 40 parts of the Sumilit Sx11F (55 parts) was replaced by heat resistant Kanevinyl. The results are shown in Table 2.

Samples of Comparative Example 7 is insufficient in weather resistance and that of Comparative Example 8 is excess in lubrication and impact resistance is insufficient because a large amount of pigment is added for color matching. Sample of Comparative Example 9 is insufficient in tensile strength, Vicar softening point and Charpy impact strength and those of Comparative Examples 10 and 11 are low in Charpy impact strength and that of Comparative Example 12 is low in tensile strength and Vicar softening point. Sample of Comparative Example 13 is insufficient in weather resistance and that of Comparative Example 14 is inferior in dynamic heat resistance and insufficient in processing stability.

TABLE 2

| | Resin (part) | | | | | | | Additive (part) | | |
|---|---|---|---|---|---|---|---|---|---|---|
| | Sumilit Sx11F | HEat resistant Kanevinyl | α-methylstyrene/acrylonitrile copolymer | Graft polymer A | Kane Ace FM | Sumigraft GF | Elaslen 301A | Pigment | Light stabilizer | |
| | | | | | | | | | Kind | Amount |
| Example | | | | | | | | | | |

TABLE 2-continued

| | | | | | | | | | |
|---|---|---|---|---|---|---|---|---|---|
| 11 | 55 | | 45 | 5 | 10 | | 0.8 | Chimassorb 944LD | 0.3 |
| 12 | 55 | | 45 | | 15 | | 0.8 | Chimassorb 944LD | 0.3 |
| 13 | 40 | 15 | 45 | 5 | 10 | | 0.8 | Chimassorb 944LD | 0.3 |
| 14 | 70 | | 30 | 5 | 10 | | 0.8 | Chimassorb 944LD | 0.3 |
| 15 | 45 | | 55 | 5 | 10 | | 0.8 | Chimassorb 944LD | 0.3 |
| 16 | 55 | | 45 | 10 | 5 | | 0.8 | Chimassorb 944LD | 0.3 |
| 17 | 55 | | 45 | 15 | | | 0.8 | Chimassorb 944LD | 0.3 |
| 18 | 55 | | 45 | 5 | 10 | | 0.8 | Chimassorb 944LD | 0.5 |
| 19 | 55 | | 45 | | 10 | 5 | 0.8 | Chimassorb 944LD | 0.5 |
| 20 | 55 | | 45 | | 10 | | 0.8 | Chimassorb 944LD | 0.3 |
| Comparative Example | | | | | | | | | |
| 7 | 55 | | 45 | 5 | 10 | | 0.8 | Sumisorb 300 | 0.5 |
| 8 | 55 | | 45 | 5 | 10 | | 3.0 | TiO$_2$ | 2.0 |
| 9 | 99 | | 1 | 1 | 1 | | 0.8 | Chimassorb 944LD | 0.3 |
| 10 | 30 | | 70 | 5 | 10 | | 0.8 | Chimassorb 944LD | 0.3 |
| 11 | 55 | | 45 | 1 | 1 | | 0.8 | Chimassorb 944LD | 0.3 |
| 12 | 98 | | 2 | 5 | 10 | | 0.8 | Chimassorb 944LD | 0.3 |
| 13 | 55 | | 45 | 5 | 10 | | 0.8 | Chimassorb 944LD | 0.03 |
| 14 | 15 | 40 | 45 | 5 | 10 | | 0.8 | Chimassorb 944LD | 0.3 |

| | Tensile strength (Kgf/mm$^3$) 20° C. | Vicat softening point (°C.) | Charpy impact strength (Kg fcm/cm$^2$) | | | Dynamic heat stability (min) |
|---|---|---|---|---|---|---|
| | | | Before exposure | After exposure for 300 hrs | Retention (%) | |
| Example | | | | | | |
| 11 | 5.4 | 96 | 24 | 22 | 92 | 33 |
| 12 | 5.4 | 96 | 25 | 23 | 92 | 32 |
| 13 | 5.6 | 99 | 22 | 20 | 91 | 30 |
| 14 | 5.2 | 94 | 26 | 24 | 92 | 31 |
| 15 | 5.6 | 98 | 20 | 18 | 90 | 34 |
| 16 | 5.4 | 96 | 22 | 20 | 92 | 33 |
| 17 | 5.3 | 95 | 17 | 16 | 94 | 34 |
| 18 | 5.4 | 96 | 24 | 23 | 96 | 33 |
| 19 | 5.3 | 95 | 24 | 22 | 92 | 33 |
| 20 | 5.3 | 95 | 23 | 21 | 91 | 33 |
| Comparative Example | | | | | | |
| 7 | 5.4 | 96 | 24 | 14 | 58 | 33 |
| 8 | 5.4 | 96 | 16 | 12 | 75 | 36 |
| 9 | 4.9 | 86 | 11 | 8 | 73 | 31 |
| 10 | 5.8 | 103 | 13 | 12 | 92 | 32 |
| 11 | 5.6 | 98 | 10 | 8 | 80 | 35 |
| 12 | 4.7 | 84 | 96 | 91 | 95 | 30 |
| 13 | 5.4 | 96 | 24 | 10 | 42 | 33 |
| 14 | 5.8 | 104 | 20 | 18 | 90 | 23 |

As explained above, the thermoplastic resin composition of the present invention is superior in processing stability and molded articles made therefrom show markedly excellent weather resistance and superior in mechanical strengths represented by tensile strength, flame retardance and chemical resistance and besides are improved in impact resistance or heat resistance and impact resistance. The compositions are used as pipes or building materials which are subjected to severe conditions, in view of the features above. More specific uses are electric wires and undergroud pipes.

We claim:

1. The method to improve weather resistance, particularly impact resistance after weathering, of a vinyl chloride polymer containing an impact modifier which comprises adding 0.1–1.0 pact by weight of hindered amine light stabilizers selected from the group consisting of poly((6-((1,1,3,3-tetramethylbutyl)amino)-1,3,5-triazine-2,4-diyl)((2,2,6,6-tetramethyl-4-piperidyl)imino) hexamethylene((2,2,6,6-tetramethyl-4-piperidyl)imine)), and bis(2,2,6,6-tetramethyl-4-piperidyl) sebacate to (1) 100 parts by weight of a mixture of 0–100 parts by weight of a vinyl chloride polymer and 0–60 parts by weight of a polymer containing no chlorine and having a glass transition temperature of 100°–200° C. and (2) 4–25 parts by weight of an impact strength modifier containing no double bond which is selected from the group consisting of chlorinated polyethylene and ethylene/vinyl acetate copolymer on which vinyl chloride is grafted.

2. A weather-resistant thermoplastic resin composition according to claim 1, wherein the component (1) comprises 80–40 parts by weight of the vinyl chloride polymer and 20–60 parts by weight of the polymer containing no chlorine and having a glass transition temperature of 100°–200° C.

3. A weather-resistant thermoplastic resin composition according to claim 1, wherein the vinyl chloride polymer in (1) is a polymer mixture of 5–50% by weight of a chlorinated vinyl chloride polymer and 95–50% by weight of a vinyl chloride polymer.

4. A weather-resistant thermoplastic resin composition according to claim 1, wherein the polymer containing no chlorine and having a glass transition temperature of 100°–200° C. in (1) is α-methylstyrene/acrylonitrile copolymer, polyglutarimide or styrene/maleic anhydride copolymer.

5. A molded article obtained from the weather-resistant thermoplastic resin composition of claim 1.

6. The method of claim 1 wherein the component (1) comprises 80–40 parts by weight of the vinyl chloride polymer and 20–60 parts by weight of the polymer containing no chlorine and having a glass transition temperature of 100°–200° C.

7. The method of claim 1 wherein the vinyl chloride polymer in (1) is a polymer mixture of 5–50% by weight of a chlorinated vinyl chloride polymer and 95–50% by weight of a vinyl chloride polymer.

8. The method of claim 1 wherein the polymer containing no chlorine and having a glass transition temperature of 100°–200° C. in (1) is α-methylstyrene/acrylonitrile copolymer, polyglutarimide or styrene/maleic anhydride copolymer.

9. A weather-resistant thermoplastic resin composition which comprises (1) 100 parts by weight of a mixture of 40–100 parts by weight of a vinyl chloride polymer and 0–60 parts by weight of a polymer containing no chlorine and having a glass transition temperature of 100°–200° C.; (2) 4–25 parts by weight of an impact strength modifier containing no double bond which contain at least one member selected from the group consisting of chlorinated polyethylene and a ethylene/vinyl acetate copolymer on which vinyl chloride is grafted; and (3) 0.1–1.0 parts by weight of hindered amine light stabilizer selected from the group consisting of poly((6-((1,1,3,3-tetramethylbutyl)amino)-1,3,5-triazine-2,4-diyl)((2,2,6,6-tetramethyl-4-piperidyl)imino)) hexamethylene((2,2,6,6-tetramethyl-4-piperidyl)imine)) and bis (2,2,6,6-tetramethyl-4-piperidyl) sebacate.

* * * * *